United States Patent [19]
Ralph

[11] Patent Number: 5,947,414
[45] Date of Patent: *Sep. 7, 1999

[54] MAIN LANDING GEAR HAVING TILTING OF MAIN GEAR PIVOT PINS

[75] Inventor: Harry C. Ralph, Kirkland, Wash.

[73] Assignee: The Boeing Company, Seattle, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,981

[22] Filed: Sep. 19, 1996

Related U.S. Application Data

[63] Continuation-in-part of application No. 08/214,483, Mar. 17, 1994, abandoned.

[51] Int. Cl.⁶ .................................................. B64C 25/36
[52] U.S. Cl. ................... 244/50; 244/100 R; 244/103 R
[58] Field of Search ................... 244/50, 100 R, 244/103 R, 102 R; 280/24.1

[56] References Cited

U.S. PATENT DOCUMENTS

| | | | |
|---|---|---|---|
| 2,538,388 | 1/1951 | Sievers | 244/50 |
| 2,943,820 | 7/1960 | Westcott, Jr. | 244/50 |
| 2,970,792 | 2/1961 | Holmes | 244/50 |
| 3,643,898 | 2/1972 | Whitener et al. | 244/50 |
| 5,110,068 | 5/1992 | Grande et al. | 244/100 R |
| 5,242,131 | 9/1993 | Watts | 244/50 |
| 5,595,359 | 1/1997 | Meneghetti | 244/103 R |

FOREIGN PATENT DOCUMENTS

| | | | |
|---|---|---|---|
| 0492688 | 7/1992 | European Pat. Off. | 244/103 R |

*Primary Examiner*—Galen L. Barefoot
*Attorney, Agent, or Firm*—Conrad O. Gardner

[57] ABSTRACT

A main landing gear system which employs Ackermann type steering utilizing kingpins and tierods wherein a plurality of paired wheels are employed and wherein each truck axle is adapted for independent steering. Electronic control means along with hydraulic directional valve means are utilized. A main landing gear having single wheel or king pin steering. Pivot pin tilting is utilized in truck type main landing gear, e.g. where a truck axle is adapted for independent steering or where single wheel or king pin steering is utilized.

3 Claims, 8 Drawing Sheets

PIVOT POINT

OVERLOADED CENTER TIRES

FLAT TIRE RADIUS

OVERLOADED TIRE

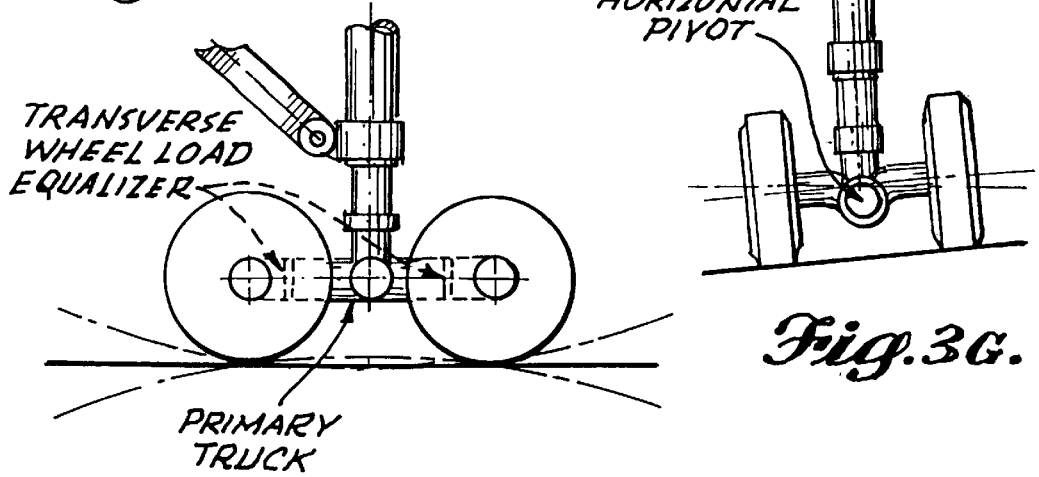
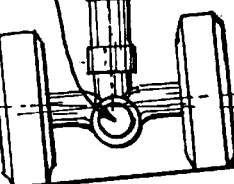

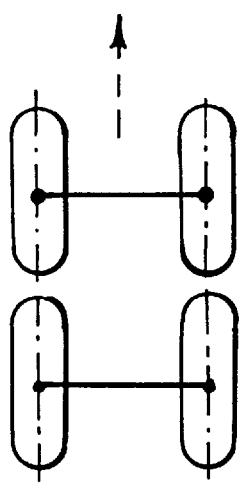 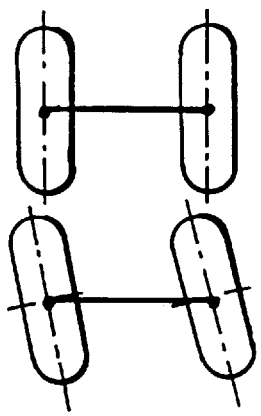 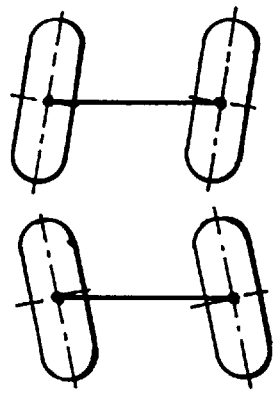
Fig.4A.   Fig.4B.   Fig.4C.
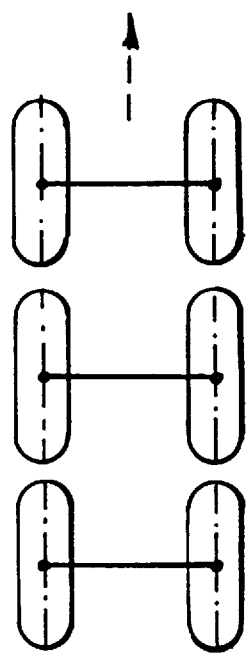 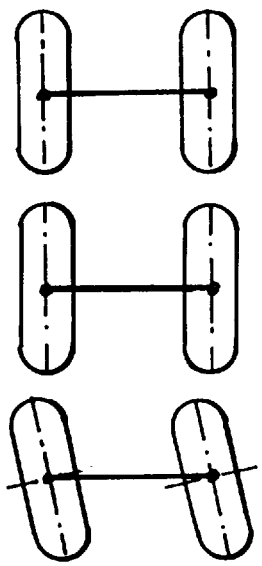 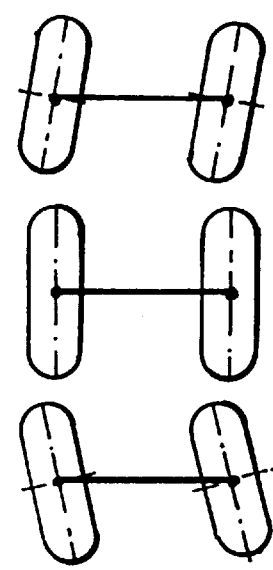
Fig.5A.   Fig.5B.   Fig.5C.

MAIN LANDING GEAR HAVING TILTING OF MAIN GEAR PIVOT PINS

CROSS-REFERENCES TO RELATED APPLICATIONS

This application is a continuation-in-part of prior application number U.S. Ser. No. 08/214,483, filed Mar. 17, 1994, now abandoned, also assigned to the Boeing Company.

BACKGROUND OF THE INVENTION

1. Field of the Invention

The present invention relates to aircraft steerable main landing gear or single wheel or ring pin steering in which pivot pin tilting is utilized.

2. Description of the Prior Art

In the patent literature, U.S. Pat. No. 2,567,074 to Kupiec; U.S. Pat No. 2,682,311 to Bishop; and U.S. Pat. No. 3,516,625 to Hauser, et al. are illustrative of steering which is accomplished by pivoting the entire truck about a vertical axis as a single unit. Control of relative rotation between trucks is accomplished by a variety of means in these systems.

U.S. Pat. No. 2,630,285 to Geisse shows a means of coupling pairs of wheels on a common axis using kingpins and tierods. Systems are shown for both single and multiple axle landing gear trucks. In contrast to the present system, castered wheels are shown for self alignment. There is no mechanism for steering the wheels.

Great Britain Patent No. 904,783 is exemplary of load equalization techniques wherein there is shown wheel truck where wheel pairs articulate about a longitudinal axis so as to equalize wheel loads when an aircraft encounters transverse terrain contours.

U.S. Pat. No. 4,917,334 to Ralph et al. shows a multi-wheeled trailing type landing gear. In this configuration, the forward axle (2 wheels) is mounted directly to the shock strut. The aft two axles, 2 wheels each, are mounted on a truck which is cantilevered from the aft side of the strut on a pivoting radius arm. Shock absorbers are used to react the vertical loads. This is in contrast to the present load equalization where a primary truck is pivoted on the shock strut, and secondary trucks are pivoted on the ends of the primary strut.

As aircraft get progressively larger, wheels per landing gear (and/or gears per aircraft) increase the amount in order to offset the problem in flotation and tire loading limitations.

However, as the number of wheels and gears increase, so does the reluctance of the main landing gear to allow the aircraft to turn during steering.

The main landing gears increasing adhesion to the ground (tracking) causes a reduction adhesion to the ground at the nose gear. When the ground adhesion at the nose gear approaches zero, the directional control of the aircraft during taxi is greatly decreased.

During tractor towing operations, the nose gear steering angle is governed by the tractor but heavy torsional loads can be induced into the main landing gears resulting in heavy designs.

The above problems have resulted in the incorporation of the "body gear steering system". However, without the advantage of load equalization the turning moments due a one tire flat situation, are reacted by the steering actuators. This results in exceptionally large and heavy actuators.

Problem

Unlike most nose landing gears, main landing gear with steering capabilities do not have a "mechanical trail" which enables the wheel/wheels to self-center in the event of hydraulic system or component failure. This mechanical trail is the distance between the center of tire contact area on the ground and center of the steering axis. Heretofore, there has been no main landing gear with steering capability which would return to center (or the "straight ahead mode") without the assistance of some independent force.

SUMMARY OF THE INVENTION

The correct angulation to a vertical of main gear steering pins could provide the tendency for the already steered wheels to veer back to a fore/aft attitude in the unlikely event of a component or system failure. This angulation is equivalent to driving the wheel uphill during the initial steering operation, and free wheeling downhill on return to center.

In the case of the single wheel (or king pin) steering, the pins would be vertical when viewed from the side elevation, and when viewed from a fore/aft elevation, the tip of the pins would lean outboard and lower end would obviously point inboard.

Similarly, rear axle steering could benefit from this application of this system concept, except that is this further embodiment two wheels are joined with a single axle and therefore the inclination of the pin would be different. The single pin is vertical when viewed from a fore/aft elevation, and the top of the pins lean forward (the lower portion of the pin would point to the rear) when viewed from a side elevation. This would also hold true for the front axle, and for any axle which has a steering requirement.

BRIEF DESCRIPTION OF THE DRAWING(S)

FIGS. 3D, 3E, 3F and 3G are illustrative of the solutions to the problems shown in FIGS. 3A, 3B and 3C;

Figure 1:
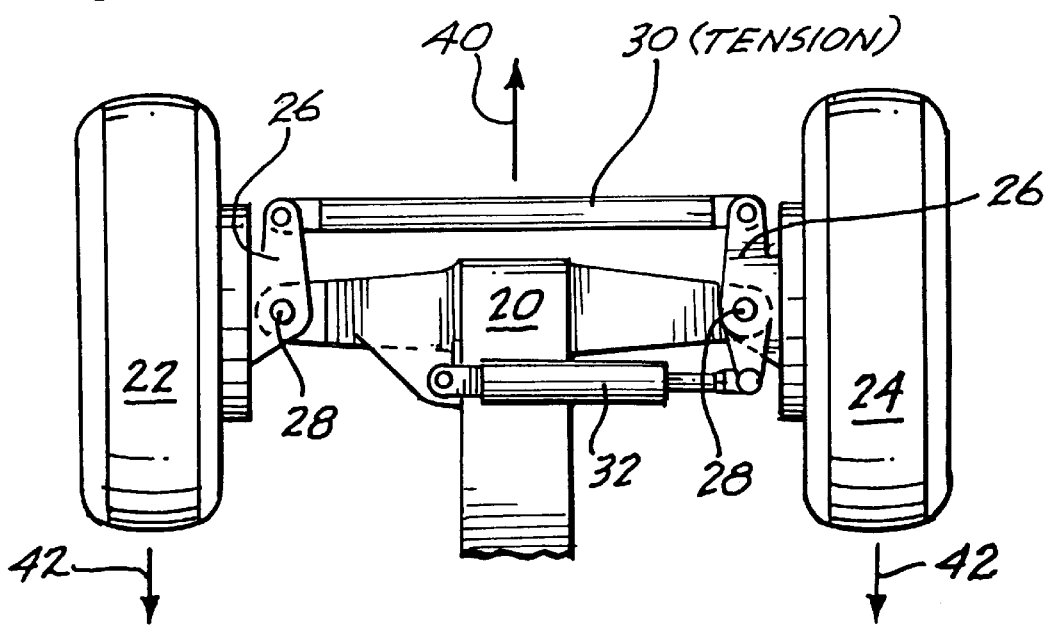
FIG. 1 is a plain view illustrative of Ackermann system components for paired wheels on a truck axle.
Figure 6:
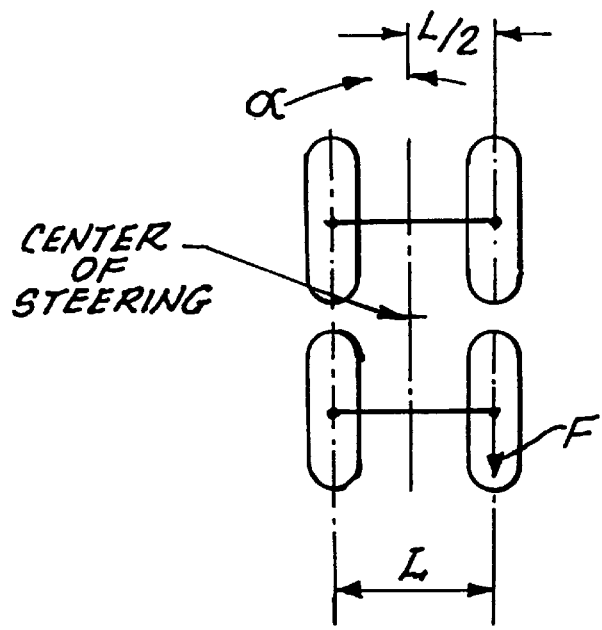
Figure 7:
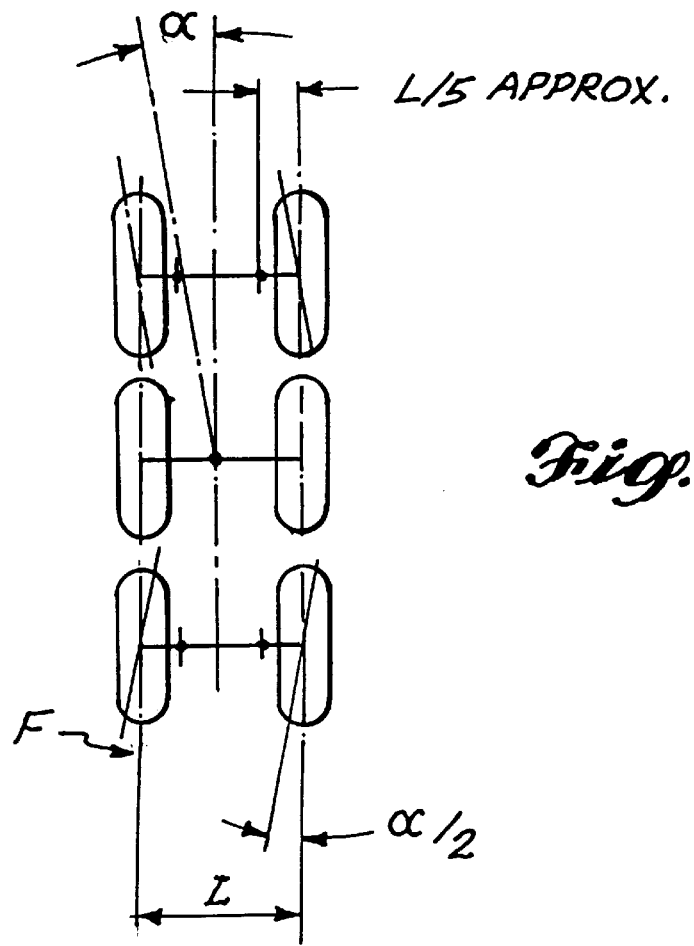
Figure 8D:
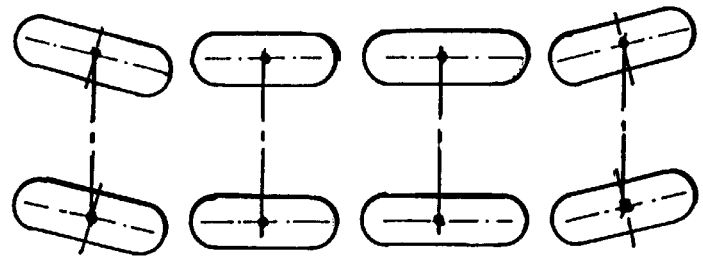
Figure 8C:
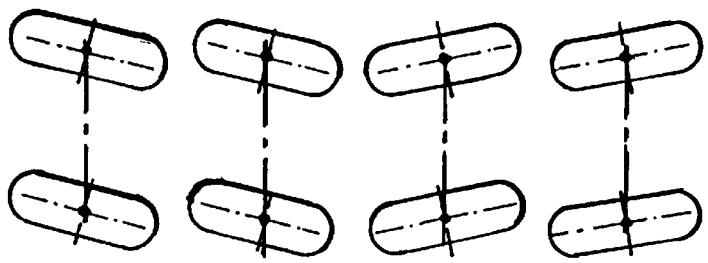
Figure 8B:
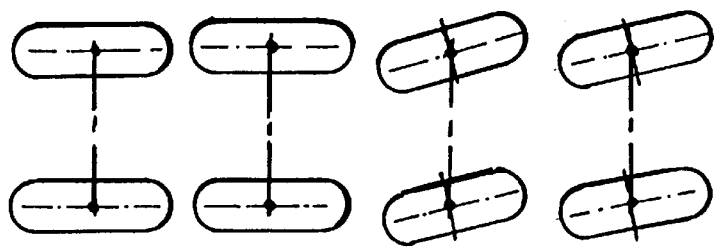
Figure 8A:
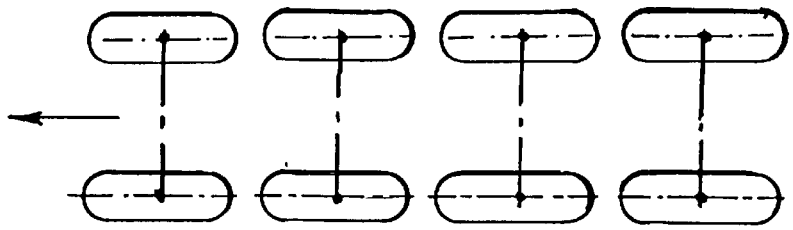
Figure 9:
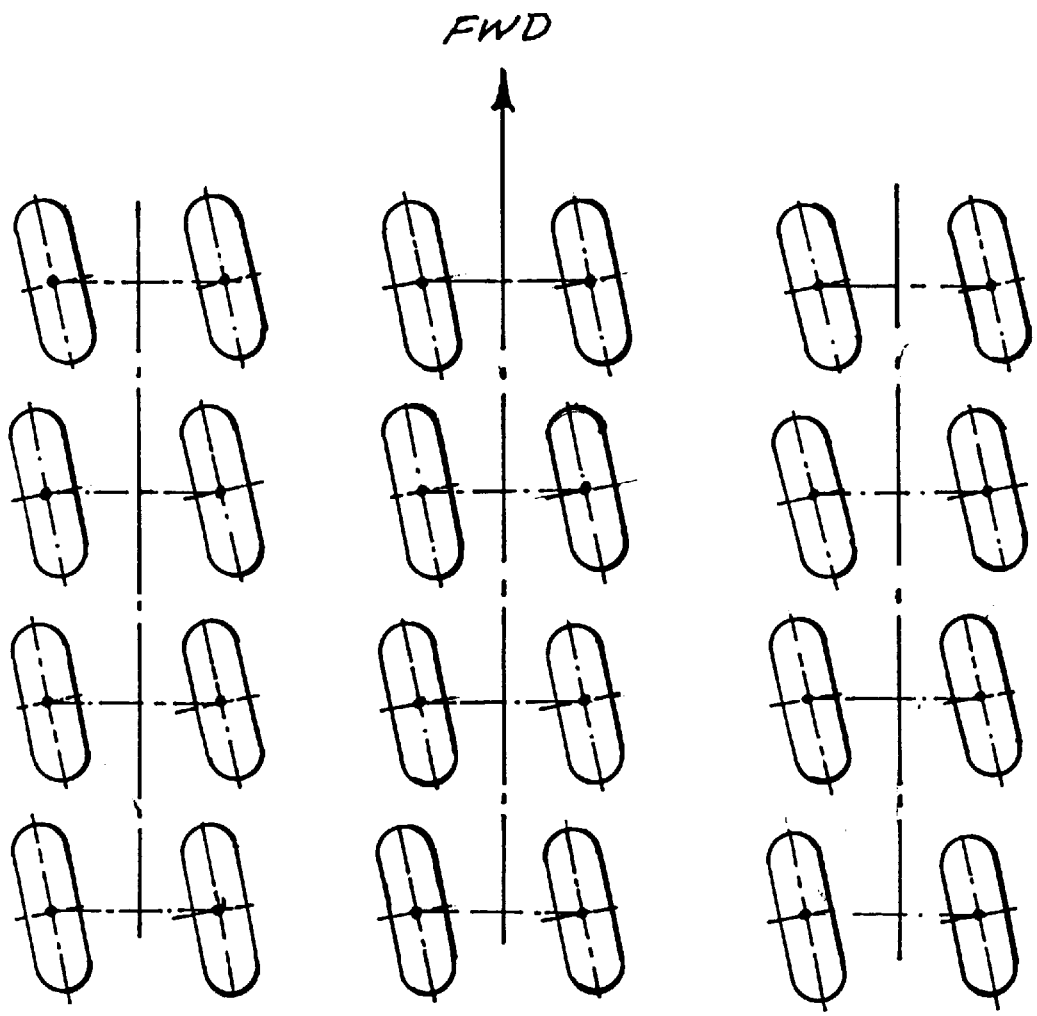
Figure 10:
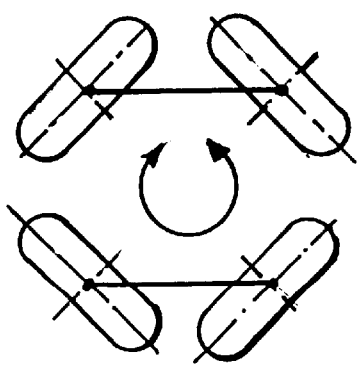
Figure 11A:
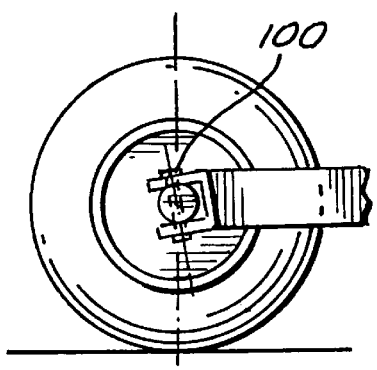
Figure 11B:
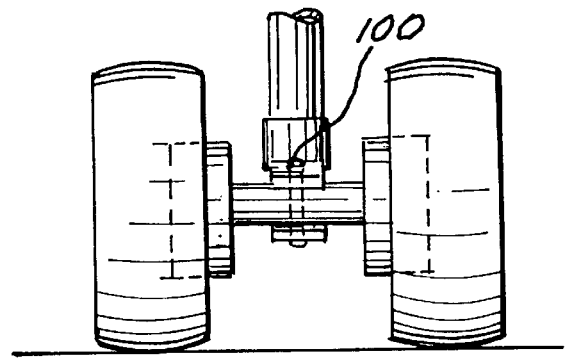
Figure 12A:
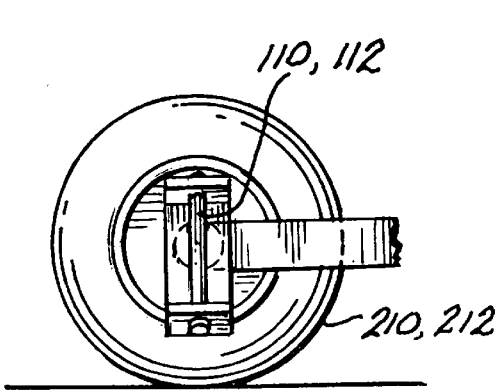
Figure 12B:
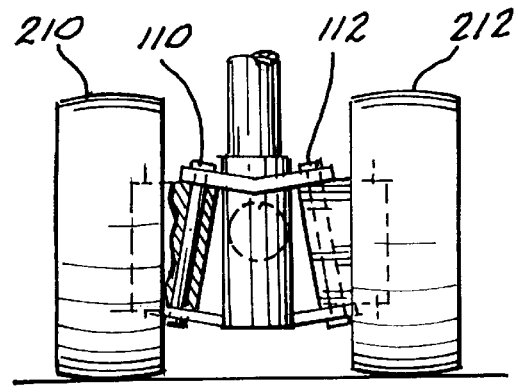

FIGS. 4A, 4B and 4C utilize the arrangement of FIG. 1 utilized for steering a 4 wheeled truck;

FIGS. 5A, 5B and 5C incorporate the steering arrangement of FIG. 1, however applied to a 6 wheeled truck;

FIG. 6 is illustrative of a Boeing 747 type aircraft body gear;

FIG. 7 is illustrative of the present single wheel steering main landing gear system;

FIGS. 8A, 8B, 8C and 8D show steering arrangements for steering an 8 wheeled truck utilizing the present single wheel steering main landing gear systems concept;

FIG. 9 is illustrative of how the present single wheeled system can be utilized in a 8 wheeled truck to offset the effect of a side drift landing;

FIG. 10 while representative of an improbable but if practical configuration relating to the near elimination of pivoting loads; and FIG. 11A is illustrative of axle steering when viewed in the fore/aft direction;

FIG. 11B is a side view illustrative of the axle steering of FIG. 11A;

FIG. 12A is a side view illustrative of single wheel steering when viewed in the fore/aft direction; and FIG. 12B is a side view illustrative of single wheel steering when viewed in the fore/aft direction.

DESCRIPTION OF THE PREFERRED EMBODIMENT(S)

A main landing gear steering system which uses the "Ackermann Steering System" (Automotive type with kingpins and tierods). Each truck axle is a candidate for independent steering, depending on the amount of control desired. When combined with electronic control of hydraulic directional valves, the axles can be turned in opposite directions to give minimum turning radius, or all turned the same direction to compensate for a side drift landing, or any combination in between.

Current landing gears do not provide independent steering of each axle on multiple axle trucks. This limits the minimum turning radius of the aircraft and induces large loads on the truck structure, thus requiring correspondingly heavy construction. This invention as exemplified in the embodiments hereinafter described is directed to a main landing gear steering concept which employs Ackermann type steering which employs kingpin and tierods wherein a plurality of paired wheels are employed and wherein each truck axle is adapted for independent steering.

The term "single wheel steering" where utilized in the following description relates to main gears having a minimum of two wheels (twin) as shown, for example, in the embodiment of FIGS. 1 and 2.

The present main landing gear single wheel steering system reacts to all movements due to a brake drag and side loads provided these loads are equally distributed between the two wheels.

Small, unequal movements due to unequal tire pressures or other incidental rolling friction variations can be accommodated by the steering acuator.

Large, unequal movements due to "one burst tire case (see FIG. 2)" and small deviations in frictional coefficients can be minimized by the use of the load equalization system solutions of FIGS. 3D, 3E, 3F and 3G. Such usage of load equalization in the present main landing gear single wheel steering systems is an option which could reduce reaction on the steering actuator by e.g, 80 percent.

Turning now to FIG. 1, a plan view of a first embodiment of the present invention can be seen in which a main gear truck 20 having two wheels 24 comprises further a bell crank 26 with vertical pin 28 per wheel, each bell crank 26 being connected symmetrically with a tie rod 30. Steering actuator 32 is coupled between bell crank 26 and main gear truck 20 by means of vertical pin 28. The forward direction is represented by arrow 40 and drag forces by arrows 42. This main landing gear single wheel steering system reacts to all movements due to brake drag and side loads provided these loads are equally distributed between two wheels 22 and 24. Small unequal movements due to unequal tire pressures or other incidental rolling friction variations can be accommodated by steering actuator 32.

Figure 2:
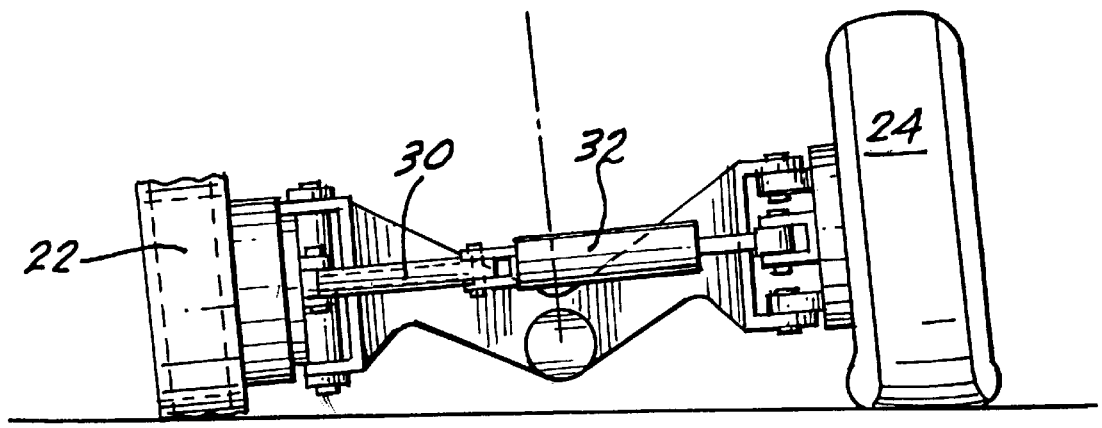
FIG. 2 is a view as FIG. 1 however looking forward and showing a flat tire.

Apart from the "one burst tire" case shown in FIG. 2 and small deviations in frictional coefficients, the movements about vertical pins 28 are equal and opposite. Each pin 28 is located in a bell crank 26 which are then connected symmetrically with a tierod 30 by means of a tensile load, a steering system used and known in the automobile industry as the "Ackermann" steering system. With the aforementioned conditions of small deviations in frictional coefficients, the load in actuator 32 would only be that required to move wheels 22 and 24 to the required steered position.

However, in the case of a flat tire (FIG. 2) wheel load equalization such as shown in FIGS. 3D, 3E, 3F and 3G must be used to enable the wheel rim (in the absence of the blown tire) to contact the ground. This maintains as much as possible the movement created by the rolling resistance of the tire prior to blowing. Any difference in rolling resistance of an unblown tire (24 in FIG. 2) and a wheel rim (tire 22 side in FIG. 2) will increase the steering actuator accordingly, "roll on rim" requirements however tend to keep this increase to a minimum.

Figure 3A:
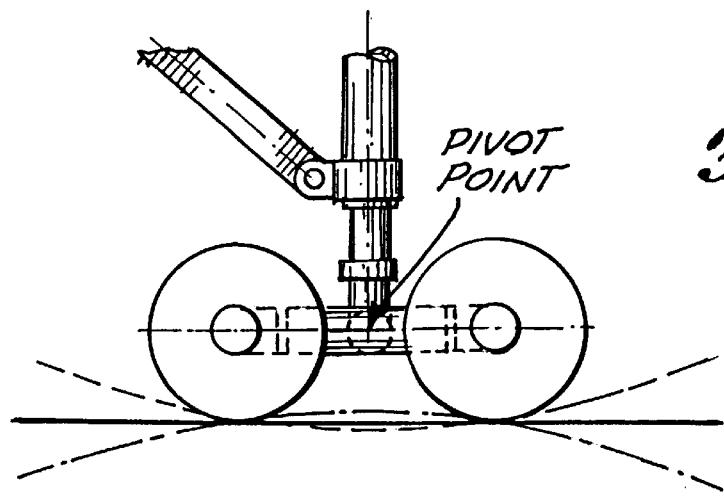
FIGS. 3A, 3B and 3C are descriptive and illustrative of the problem of wheel load equalization in multi axled landing gear.

Turning now to the wheel load equalization problem, it can be appreciated that due to depressions and humps in the surface of runways it is difficult to achieve equal loading of wheels associated with multi-axled landing gears. Equal loading in a fore and aft direction for 3 or 4 wheeled trucks is achieved as shown in FIG. 3A.

Figure 3B:
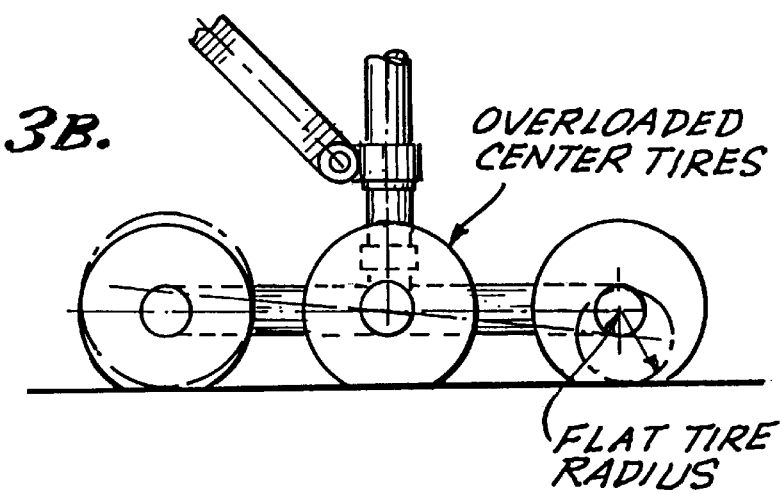

For trucks consisting of 5 (or more) wheels, load equalization cannot be achieved completely by the single continuous truck beam as shown in FIG. 3B.

Figure 3C:
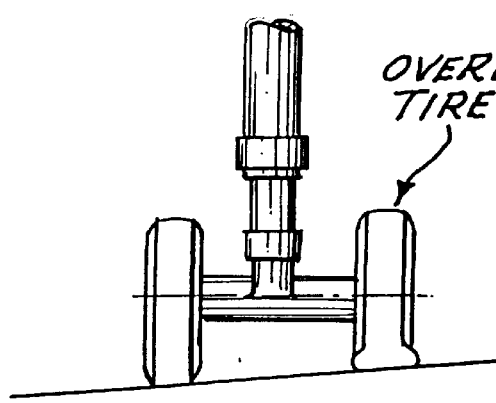

Equal loading in the transverse direction is not achievable on conventional wheel axles as shown in FIG. 3C. This statement applies to all landing gears having twin type multi-axles. Note:

The problem of unequal loading is less with landing gears having 4 (or less) wheels, The deflection has a beneficial effect, The problem becomes an issue with landing gears having 5 (or more) wheels, Unequal tire loading would adversely affect brake performance, tire wear, and fatigue life of related component parts.

FIGS. 3D, 3E, 3F and 3G show proposed solutions to the problem of load equalization.

(a) Load Equalization—Fore and Aft Direction

FIGS. 3E and 3F illustrate the arrangement of multiple truck beams in order to achieve load equalization. This system could be expanded to utilize a 3rd order truck but is considered too complex and unnecessary for a landing gear application.

(b) Load Equalization—Transverse Direction

Note the horizontal pivot in FIG. 3G.

Wheel load equalization (fore and aft) is achieved by the use of primary and secondary truck beams as shown, e.g., in combinations of wheels above 5 (see FIGS. 3E and 3F).

Wheel load equalization (transverse) is achieved by introducing a horizontal pivot to each axle (see FIG. 3G).

In wheel load equalization a wheel truck for an aircraft landing gear carries a plurality of wheel sets, each set having a left-hand wheel and a right-hand wheel. The wheels of any given set are free to rotate about a longitudinal axis so that they will follow transverse ground contours as the aircraft taxis. Each wheel set, as a whole, can also pivot about a transverse axis, in order to adaptively follow longitudinal ground contours. The pivotable mounting arrangement of the wheels to the truck enables all wheels to maintain an equal force contact with the ground, so that one wheel will not be overloaded relative to another.

ADVANTAGES OF MAIN LANDING GEAR SINGLE WHEEL STEERING

1. MULTIPLE STEERING MODES

The arrangement herein before discussed of FIG. 1 can be incorporated for use in multiple wheeled gears as shown in FIGS. 4,5,6,9 and 10. The directional control of each wheel is achieved by electronic control of the hydraulic directional valves of the wheels.

Steering arrangements for steering a 4 wheeled truck are shown in FIG. 4A, 4B and 4C while steering a 6 wheeled truck is shown (moving to the right) in sequenced steps of FIGS. 5A, 5B and 5C.

Steering arrangements for an 8 wheeled truck are shown in FIGS. 8A, 8B, 8C and 8D.

FIG. 9A, Band C shows how the present single wheeled system can be utilized to offset the effect of a side drift landing. The angle of yaw is measured by any means (e.g., radar, lazer inertial control) and fed as an electrical signal to hydraulic directional control valves to obtain the required position of all wheels.

FIG. 10 is included merely for purposes of further understanding and shows an improbable situation but one which if it was at all practical could save landing gear weight by the near elimination of pivoting loads.

2. REDUCED MOVEMENT ARM

The reduced movement arm is a result of the reduced distance from the kingpin centerline and tire centerline as compared to distances currently utilized in e.g., a Boeing type 747 body gear (of FIG. 6) where:

$$\text{Steering Torque} = \frac{FL}{2} \text{ in lbs (approximately)}$$

The example for main gear single wheel steering is then as shown in FIG. 7 where:

$$\text{Steering Torque} = \frac{FL}{5} \text{ in lbs approximately}$$

ADVANTAGES OF THE PRESENT MAIN LANDING GEAR SINGLE WHEEL STEERING EMBODIMENTS INCLUDE

1. The use of the "Ackermann Steering System" on aircraft landing gear, i.e., the method of minimizing the loads normally transferred to the steering actuators.

2. The use of a steering system which permits individual wheel movement in different directions as required.

3. The feature of the steering angle being twice that of the single wheel angular movement. This is achieved by steering leading and trailing twin axles in opposite directions. (See FIGS. 4C, 5C and 8A, 8B and 8C.)

4. The ability of all wheels on all gears to be directionally controlled for all side drive landing using the main gear steering system. (See FIGS. 9A, and 9D.)

5. Possible positioning of wheels for relieving pivoting loads.

STEERING PERFORMANCE WITH VERTICAL STEERING PINS ANGULATED WITH RESPECT TO THE VERTICAL AXIS OF THE LANDING GEAR

By utilizing the vertical load on the gear, a rotational motion around the center of the steering pin can be achieved. The amount and direction of this motion is dependent upon the amount and direction of the tilt of the pin.

Irrespective of the direction of steering, it is required that this motion (induced by the vertical load) always causes the wheel to want to return to a straight ahead attitude.

In the case of rear axle steering shown in FIGS. 11A and 11B, the tile of pivot pin 100 would be zero when viewed in the fore/aft direction (FIG. 11B), but when viewed from the side (FIG. 11A), pin 100 tilts so that the top of the pinpoints forward and consequently the lower end of the pin points rearward. This would apply also to the front axle should that be steered.

The tilting for single wheel steering (king pin steering) shown in FIGS. 12A and 12B is quite different as far as direction is concerned. Because each pin 110, 112 controls one wheel 210, 212 respectively (see FIG. 12B), pins 110 and 112 will be vertical when viewed from the side elevation (see FIG. 12A), and tilted when observed in the fore/aft plane of FIG. 12B. In order for the wheel to feel resistance to the movement as the steering angle increases (and consequently seeks to return to the straight ahead mode), the top of the pivot pin would lean inboard (towards the truck center line), and the lower part of the pin would obviously lean outboard (away from the truck center line). This is true for both left 210 and right 212 hand wheels as seen in FIG. 12B.

What is claimed is:

1. In combination in an aircraft:

a main landing gear truck including a wheel and brake assembly and having single wheel (King Pin) steering;

a pivot pin controlling one wheel; and said pivot pin arranged vertically with respect to the vertical axis of the main landing gear truck when viewed from side elevation and tilted with respect to the vertical axis of the landing gear when observed in the fore and aft plane thereby reducing the potential energy of said wheel and brake assembly during a hardover condition following a potential linkage failure.

2. In combination in the landing gear of an aircraft;

the top of a pivot pin leaning inboard toward a truck center line and the lower part of said pivot pin leaning outboard away from said truck center line;

said pivot pin providing an increasing resistance to the rotational motion of the wheel around the said pivot pin center line in the event of either electrical, hydraulic, pneumatic, or mechanical failure of the steering system; and said resistance to the rotational motion of the wheel continuing beyond the steering range of the system until the wheel contacts the nearest mechanical stop.

3. In combination in an aircraft landing gear:

a pivot pin (King Pin) controlling the revolution of one wheel, and said pivot pin (King Pin) arranged vertically with respect to the vertical axis of the landing gear when viewed from side elevation, and said pivot pin (King Pin) tilted with respect to the vertical axis of the landing gear when observed in the fore and aft plane, and the top of said pivot pin (King Pin) leaning inboard toward a landing gear truck center line, and the lower part of the said pivot pin (King Pin) leaning outboard away from said truck center line, and said pivot pin (King Pin) providing increasing resistance to the rotational motion of the said wheel around said center line in the event of the said mechanical failure, and as a result of said pivot pin (King Pin) tilting, and said resistance to the rotational motion of the said wheel continuing to increase beyond the steering range of the system, until the wheel contacts the nearest mechanical stop, thereby providing reduction of possible structural damage, and said rotational motion providing for activation of a shock absorbing device between the said wheel and mechanical stop, thereby further reducing the possibility of damage.

* * * * *